(12) United States Patent
Kobayashi et al.

(10) Patent No.: US 11,616,891 B2
(45) Date of Patent: Mar. 28, 2023

(54) INFORMATION PROCESSING APPARATUS AND NON-TRANSITORY COMPUTER READABLE MEDIUM FOR ANALYZING AN IMAGE CAPTURE IN A TIME SERIES WITH RESPECT TO CONTENT OF PARAMETER AND MAKING AN ASSUMPTION HOW USER PERFORMED OPERATION IN AN APPARATUS

(71) Applicant: FUJIFILM BUSINESS INNOVATION CORP., Tokyo (JP)

(72) Inventors: Tetsuya Kobayashi, Kanagawa (JP); Akira Kadoda, Kanagawa (JP); Shun Mitsui, Kanagawa (JP); Tomohiko Ninomiya, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 494 days.

(21) Appl. No.: 16/529,026

(22) Filed: Aug. 1, 2019

(65) Prior Publication Data
US 2020/0274976 A1   Aug. 27, 2020

(30) Foreign Application Priority Data

Feb. 26, 2019   (JP) .............................. JP2019-032825

(51) Int. Cl.
*H04N 1/00* (2006.01)
*H04W 88/02* (2009.01)
*G06F 3/12* (2006.01)

(52) U.S. Cl.
CPC ....... *H04N 1/0097* (2013.01); *H04N 1/00129* (2013.01); *H04N 1/00474* (2013.01); *G06F 3/1255* (2013.01); *G06F 3/1258* (2013.01); *H04N 2201/0094* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2013/0114100 | A1* | 5/2013 | Torii | H04N 1/00037 358/1.14 |
| 2013/0169996 | A1* | 7/2013 | McLeod | G06F 11/0733 358/3.28 |
| 2013/0321838 | A1* | 12/2013 | Ono | G06F 3/1292 358/1.13 |

(Continued)

FOREIGN PATENT DOCUMENTS

| | | |
|---|---|---|
| JP | 2015-084028 A | 4/2015 |
| JP | 2016-76746 A | 5/2016 |

OTHER PUBLICATIONS

Dec. 27, 2022 Office Action issued in Japanese Patent Application No. 2019-032825.

*Primary Examiner* — Haris Sabah
(74) *Attorney, Agent, or Firm* — Oliff PLC

(57) ABSTRACT

An information processing apparatus includes an assumption unit and a storing unit. The assumption unit makes an assumption of content of a parameter set by a user by analyzing an image captured in a time series and depicting how the user performs an operation of a first apparatus designated as a target for recording the operation. The storing unit stores the assumed content of the parameter as an operation record.

9 Claims, 18 Drawing Sheets

(56) References Cited

U.S. PATENT DOCUMENTS

2015/0365542 A1* 12/2015 Kim .................. H04N 1/32101
358/1.14
2019/0132460 A1* 5/2019 Sawano ............. H04N 1/00424

* cited by examiner

INFORMATION PROCESSING APPARATUS AND NON-TRANSITORY COMPUTER READABLE MEDIUM FOR ANALYZING AN IMAGE CAPTURE IN A TIME SERIES WITH RESPECT TO CONTENT OF PARAMETER AND MAKING AN ASSUMPTION HOW USER PERFORMED OPERATION IN AN APPARATUS

CROSS-REFERENCE TO RELATED APPLICATIONS

This application is based on and claims priority under 35 USC 119 from Japanese Patent Application No. 2019-032825 filed Feb. 26, 2019.

BACKGROUND

(i) Technical Field

The present disclosure relates to an information processing apparatus and a non-transitory computer readable medium.

(ii) Related Art

Image forming apparatuses that form an image on, for example, paper or another recording medium are provided with a function of registering a repeatedly performed operation and registering parameter values in a job memory as a function of assisting a user. Simply pressing a button enables setting operation registered in the job memory to be called. The job memory may also store therein hierarchical screens and the like displayed in the course of a series of operations. Japanese Unexamined Patent Application Publication No. 2016-76746 is an example of the related art.

SUMMARY

However, the job memory is a function of storing the operated part of a screen, and thus how the content of a parameter in the screen is changed is not stored. In addition, the job memory has a close relationship with an image forming apparatus and does not assume transfer of the parameter to a different image forming apparatus. Accordingly, if a different image forming apparatus is used, all of a series of operations need to be performed manually.

Nevertheless, as an image forming apparatus has increasingly have multiple functions, the configuration and content of a user interface screen provided for the image forming apparatus have also been complicated. This may lead to a failure of the finding of an item intended to be set or a longer time until the finding. In addition, products by even the same manufacturer have different configurations and content of user interface screens, depending on a difference in launching time and market in some cases.

Aspects of non-limiting embodiments of the present disclosure relate to facilitating a user operation of an unfamiliar apparatus compared with a user operation of an apparatus only by using information obtained from an unfamiliar operation screen.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including an assumption unit and a storing unit. The assumption unit makes an assumption of content of a parameter set by a user by analyzing an image captured in a time series and depicting how the user performs an operation on a first apparatus designated as a target for recording the operation. The storing unit stores the assumed content of the parameter as an operation record.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment of the present disclosure will be described with reference to the drawings.

EXEMPLARY EMBODIMENT

Overall System Configuration

Figure 1:
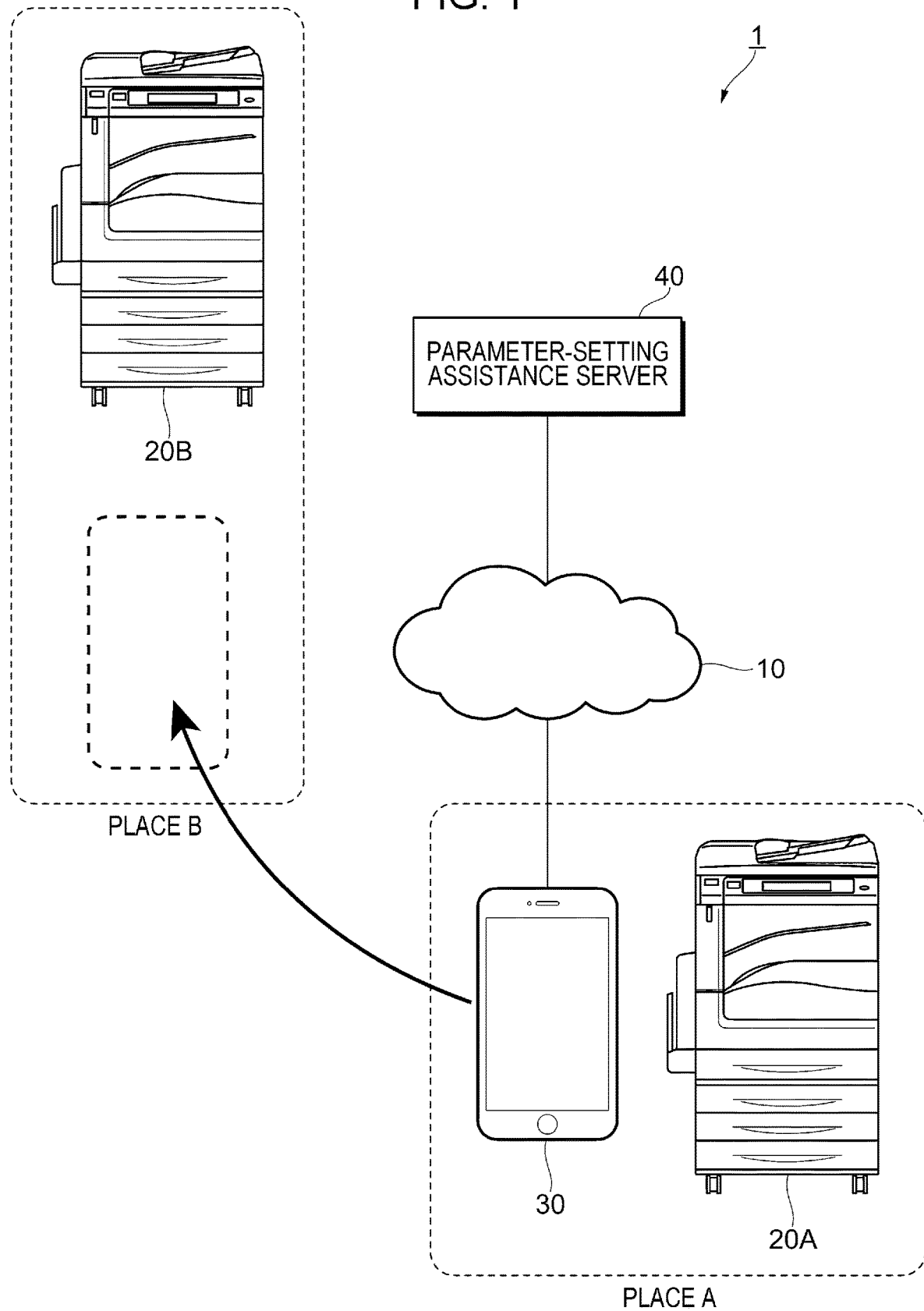
FIG. 1 is a diagram for explaining the conceptual configuration of an information processing system used in an exemplary embodiment.

FIG. 1 is a diagram for explaining the conceptual configuration of an information processing system 1 used in the exemplary embodiment. The information processing system 1 includes the Internet 10, an image forming apparatus 20A installed in a place A, an image forming apparatus 20B installed in a place B, a terminal apparatus 30 carried with a user, and a parameter-setting assistance server 40.

The terminal apparatus 30 in this exemplary embodiment is connected to the parameter-setting assistance server 40 via the Internet 10.

The example in FIG. 1 illustrates one image forming apparatus 20A, one image forming apparatus 20B, and one terminal apparatus 30; however, multiple image forming apparatuses 20A, multiple image forming apparatuses 20B, and multiple terminal apparatuses 30 may be present.

This exemplary embodiment assumes that the image forming apparatus 20A in the place A is an apparatus that a user operating the terminal apparatus 30 is accustomed to use (hereinafter, also referred to as a familiar apparatus). The image forming apparatus 20A is thus an example of a first apparatus.

In this exemplary embodiment, the phrases "accustomed to use" and "familiar" are used to indicate that a user performs an operation for setting a parameter for specifying an action of an apparatus to be operated and an attribute thereof (hereinafter, collectively referred to as a parameter) without being lost. It suffices that at least one familiar parameter setting is provided.

The model of the familiar image forming apparatus 20A is not limited to one model, and multiple models may be provided. In addition, multiple manufacturers may manufacture the familiar image forming apparatuses 20A.

This exemplary embodiment assumes that the image forming apparatus 20B in the place B is an apparatus that the user operating the terminal apparatus 30 is not accustomed to use (hereinafter, also referred to as an unfamiliar apparatus). The image forming apparatus 20B is thus an example of a second apparatus.

Basically, an apparatus other than the familiar image forming apparatus 20A is the image forming apparatus 20B the user is not accustomed to use or operate. Accordingly, a difference between installed places does not have a relationship with the familiarity or unfamiliarity. In this exemplary embodiment, for convenience of explanation, the image forming apparatus 20A installed in the place A is referred to as a familiar apparatus, and the image forming apparatus 20B installed in the place B is referred to as an unfamiliar apparatus. Accordingly, the familiar image forming apparatus 20A and the unfamiliar image forming apparatus 20B may be installed even in the same place A.

The user not accustomed to operate the operation target image forming apparatus 20B needs to find buttons or the like for respective parameters intended to be set on the operation screen and operate the buttons one by one. For example, even if the name of a function used on the operation screen of the image forming apparatus 20B is identical to the name of a function used on the operation screen of the image forming apparatus 20A, but if the operation screens have different layouts, the user operation becomes difficult. In addition, if the functions have different names, it also becomes difficult to verify whether the names correspond to the same function.

Moreover, regarding the attribute of a parameter, even though an attribute in the image forming apparatus 20A is 1, an attribute needs to be 2 in the image forming apparatus 20B in some cases. This is likely to occur, for example, when different densities are to be set. As described above, it is not necessarily easy to reproduce the same action on the unfamiliar image forming apparatus 20B as those on the familiar image forming apparatus 20A.

The image forming apparatuses 20A and 20B in this exemplary embodiment have functions of copying, scanning, and faxing. Accordingly, the image forming apparatuses 20A and 20B include an image reading unit that reads an image on the document, an image forming unit that records an image on the paper sheet that is an example of a recording medium, an image processing unit that performs processing such as color correction and tone correction on an image represented by image data, a control unit that controls overall apparatus actions, a memory unit that stores the image data and the like, a display unit used for displaying a user interface screen and the like, an operation receiving unit that receives a user operation, and a communication interface (communication IF) that implements communications via a local area network (LAN) or the like. It goes without saying that this apparatus configuration is an example.

The parameter-setting assistance server 40 assists the user in cooperation with the terminal apparatus 30 operated by the user to easily reproduce, in the image forming apparatus 20B, a parameter setting registered in the image forming apparatus 20A registered in advance.

In this exemplary embodiment, the terminal apparatus 30 is a portable terminal. The portable terminal includes, for example, a smartphone, a wearable terminal, and a notebook computer. Examples of the wearable terminal include a wrist wearable terminal and an eye-glass wearable terminal worn on the head.

The eye-glass terminal includes a terminal called transparent eye-glass terminal using a transparent plate having a hologram optical element integrated therein. The hologram optical element has a property of transmitting light made incident from the front and a property of refracting image light transmitted through the transparent plate to output the light toward the eyes of the user. Accordingly, the user wearing the eye-glass terminal may see an image in which a virtual image or text is superimposed on a real object.

Configuration of Apparatuses
Configuration of Terminal Apparatus

Figure 2:
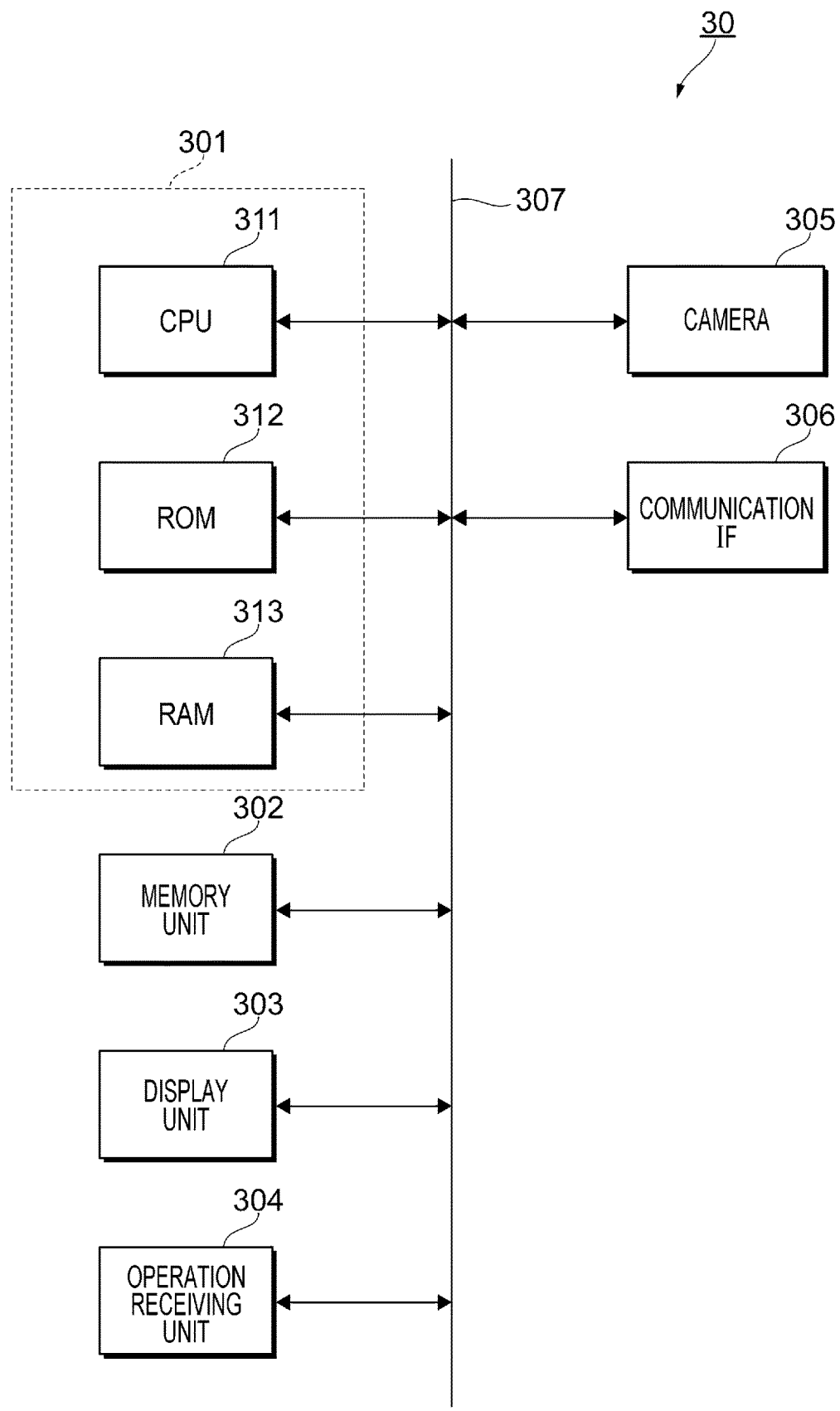
FIG. 2 is a diagram illustrating an example configuration of a terminal apparatus used in the exemplary embodiment.

FIG. 2 is a diagram illustrating an example configuration of the terminal apparatus 30 used in the exemplary embodiment.

The terminal apparatus 30 illustrated in FIG. 2 includes a control unit 301 that controls overall apparatus actions, a memory unit 302 that stores image data and the like therein, a display unit 303 used for displaying a user interface screen and the like, an operation receiving unit 304 that receives a user operation, a camera 305 used for capturing an image, and a communication interface 306.

The camera 305 herein is capable of capturing a still image and a moving image.

The control unit 301 in this exemplary embodiment includes a central processing unit (CPU) 311, a read only memory (ROM) 312 that stores therein firmware, basic input output system (BIOS), and the like, and a random access memory (RAM) 313 used as a work area. The control unit 301 functions as a computer.

The memory unit 302 is composed of, for example, a nonvolatile reprogrammable semiconductor memory. The memory unit 302 stores therein data and the like regarding images captured with, for example, the camera 305.

The display unit 303 is composed of, for example, a liquid crystal display or an organic electroluminescence display. The display unit 303 displays information for user operation assistance.

The operation receiving unit 304 is composed of a touch sensor, a switch, buttons, and the like that are disposed on the surface of the display unit 303.

The control unit 301 is connected to the other units and the like via a bus 307 or an unillustrated signal wire.

Figure 3:
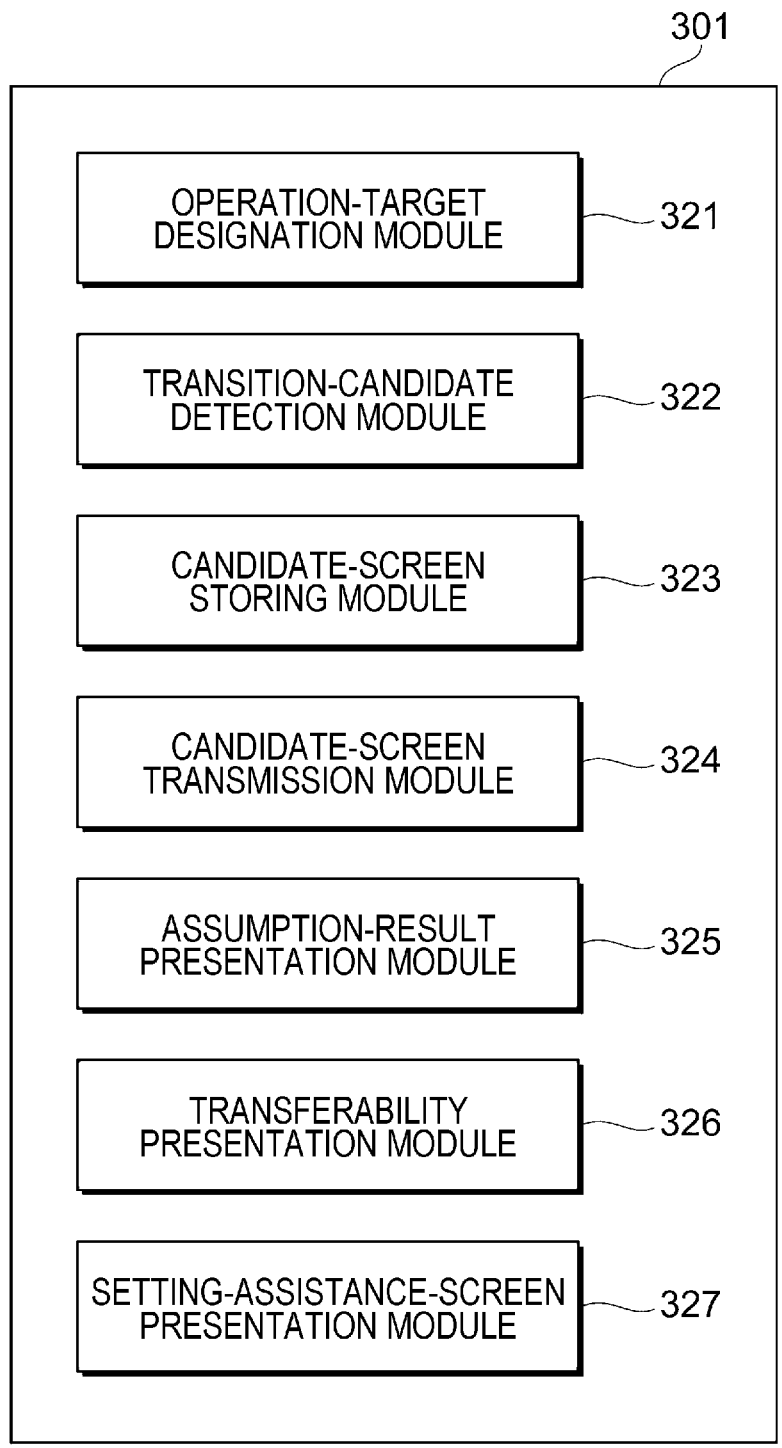
FIG. 3 is a diagram for explaining a functional configuration implemented by the control unit of the terminal apparatus.

FIG. 3 is a diagram for explaining a functional configuration implemented by the control unit 301 of the terminal apparatus 30. The functional modules illustrated in FIG. 3 are implemented in such a manner that the CPU 311 (see FIG. 2) runs a program. Note that the functional modules illustrated in FIG. 3 are examples of functional modules provided by the control unit 301.

The control unit 301 in the exemplary embodiment functions as an operation-target designation module 321 that designates the operation target model, a transition-candidate detection module 322 that detects at least one candidate for a transition-target operation screen, a candidate-screen storing module 323 that stores an operation screen before transition and the candidate for the operation screen after transition, a candidate-screen transmission module 324 that transmits the operation screen candidate, an assumption-result presentation module 325 that presents a result of an assumption by the parameter-setting assistance server 40 (see FIG. 1), a transferability presentation module 326 that presents a result of verification of whether a setting in a registered setting operation is transferable to a designated model, and a setting-assistance-screen presentation module 327 that presents a screen for assisting in an operation for implementing the same setting as the setting implemented by the registered operation.

The operation-target designation module 321 in this exemplary embodiment is run when the user gives an instruction to record a setting operation. In this exemplary embodiment, the operation-target designation module 321 designates the operation target image forming apparatus 20A or the like by using at least one of multiple methods described below.

One of the methods is a method in which a string of characters or numerical values on the label captured by the camera 305 (see FIG. 2) is read and the model is designated. In this method, the captured image undergoes character recognition and is converted into a character code. The string of characters or numerical values on the label is disposed on the housing of the operation target or displayed on the operation screen.

One of the other methods is a method in which the model is designated from an image captured with the camera 305 regarding the appearance of the image forming apparatus 20A or the like. The operation-target designation module 321 performs matching with appearance pictures prepared in advance, pictures of characteristic parts, or the like and thereby identifies one or more candidates. If multiple candidates are identified, information regarding an apparatus selected by the user is acquired.

One of the other methods is a method in which information designating the model is acquired on the basis of logical or physical connection with the operation target model.

The operation target model is designated, for example, in such a manner that the user selects a model from a list.

In this exemplary embodiment, the transition-candidate detection module 322 is run after the operation-target designation module 321 designates the apparatus.

The transition-candidate detection module 322 processes data regarding images captured for operations of an operation screen and detects occurrence of an event highly likely to be operation screen transition. Examples of the event highly likely to be operation screen transition include a change of the layout or the like of the entire operation screen, moving of the location of a radio button or the like, a change in display color or luminance of a designation button. For example, the color of a button the state of which is changed from an unselected state to a selected state is changed to display color different from the other components. The luminance of the button the state of which is changed from the unselected state to the selected state is changed to luminance higher from the luminance of the other buttons.

The transition-candidate detection module 322 detects at least one operation screen transition candidate by the end time point of the data regarding the image captured by the user. In this exemplary embodiment, the end time point of the image data is, for example, a time point when the user gives an instruction to terminate the image capturing, when sound such as mechanical sound indicating the end of a setting operation is detected, or when a predetermined period of time elapses with a change of the operation screen not detected.

In this exemplary embodiment, the transition of the operation screen is detected by the parameter-setting assistance server 40 (see FIG. 1). Accordingly, the transition-candidate detection module 322 performs only detection of the candidate highly likely to be operation screen transition.

For example, in a case where an image depicting how an operation is performed is captured as a moving image, the transition-candidate detection module 322 serially compares a frame with the succeeding frame and determines whether a difference between the frames exceeds a predetermined threshold. If the difference between the frames exceeds the predetermined threshold, the transition-candidate detection module 322 in this exemplary embodiment determines that operation screen transition is highly likely to occur.

Note that a change caused by a finger or a hand included in the image during operation is desirably ignored. Nevertheless, even if the change caused by a finger or a hand included in the image is detected as a change in the operation screen, the detection of the operation screen transition at the final stage is performed by the parameter-setting assistance server 40 (see FIG. 1).

The candidate-screen storing module 323 stores operation screens at respective time points before and after the time point of detection of the transition candidate in the memory unit 302 (see FIG. 2). The operation screens stored in the memory unit 302 also have additional data such as image capturing time recorded therein.

The candidate-screen transmission module 324 transmits the operation screen stored as the transition candidate on the basis of information indicating the transmission destination of the operation screen. In this exemplary embodiment, the address of the parameter-setting assistance server 40 on the Internet 10 (see FIG. 1) is recorded as the information indicating the transmission destination. The information indicating the transmission destination is provided when an application program is installed or updated. For example, a uniform resource locator (URL) is used as the information.

The assumption-result presentation module 325 presents a result of an assumption of a parameter set through a user operation to the display unit 303 (see FIG. 2). The assumption result is provided by using combination of parameters. The assumption result is provided by the parameter-setting assistance server 40.

The transferability presentation module 326 is started in a case where the user intends to verify in advance whether the same setting as in an operation registered for the image forming apparatus 20A is implementable in a different apparatus. In this exemplary embodiment, the transferability presentation module 326 provides the parameter-setting assistance server 40 with information designating a model to which the user intends to transfer the setting. The transferability presentation module 326 receives a result of verification of whether the same setting as that in the designated operation is implementable on the designated model. The verification result is provided for each parameter. For example, a result indicating that a parameter is settable but a parameter is not settable is notified. The transferability presentation module 326 herein is an example of a presentation unit.

On the basis of an operation screen to be actually operated, the setting-assistance-screen presentation module 327 presents steps for and the content of an operation needed to implement, on a model to be operated by the user, the same setting as that in a registered operation designated by the user. The setting-assistance-screen presentation module 327 proceeds processing in cooperation with the parameter-setting assistance server 40. The setting-assistance-screen presentation module 327 herein is an example of the presentation unit.

Configuration of Parameter-Setting Assistance Server

Figure 4:
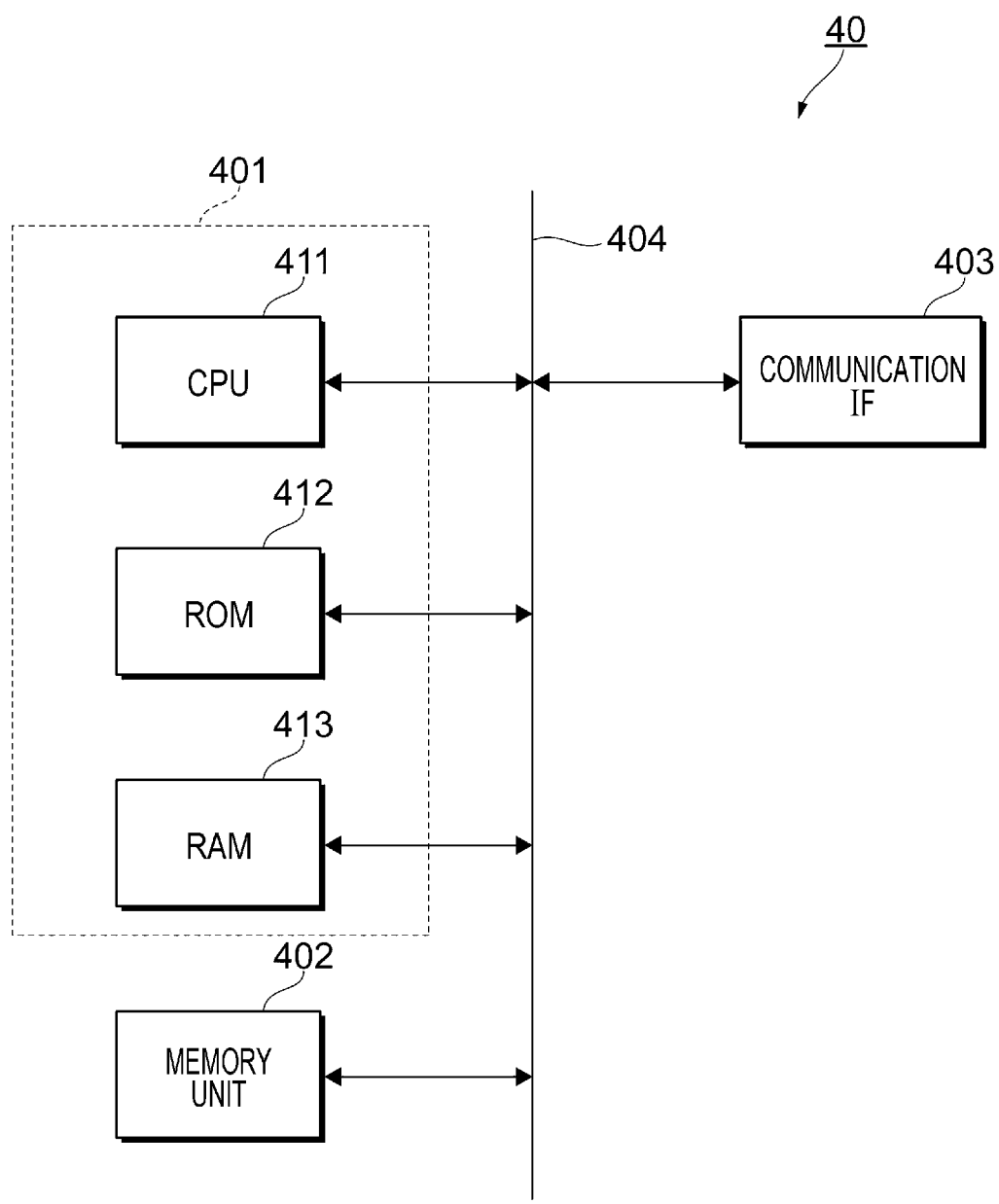
FIG. 4 is a diagram for explaining an example configuration of a parameter-setting assistance server used in the exemplary embodiment.

FIG. 4 is a diagram for explaining an example configuration of the parameter-setting assistance server 40 used in the exemplary embodiment.

The parameter-setting assistance server 40 illustrated in FIG. 4 includes a control unit 401 that controls overall apparatus actions, a memory unit 402 that stores data used for parameter setting assistance, and a communication interface 403.

The control unit 401 in this exemplary embodiment includes a CPU 411, a ROM 412 that stores firmware, BIOS, and the like, and a RAM 413 used as a work area. The control unit 301 functions as a computer.

The memory unit 402 is composed of, for example, a hard disk drive (HDD) that is a nonvolatile memory device. The memory unit 402 stores therein a parameter for an operation registered by the user, an operation screen transmitted from the terminal apparatus 30 (see FIG. 1), a parameter assumed for the user operation, operation screens for each model of the assistance target apparatus, and the like.

The control unit 401 is connected to the other units and the like via a bus 404 or an unillustrated signal wire.

Figure 5:
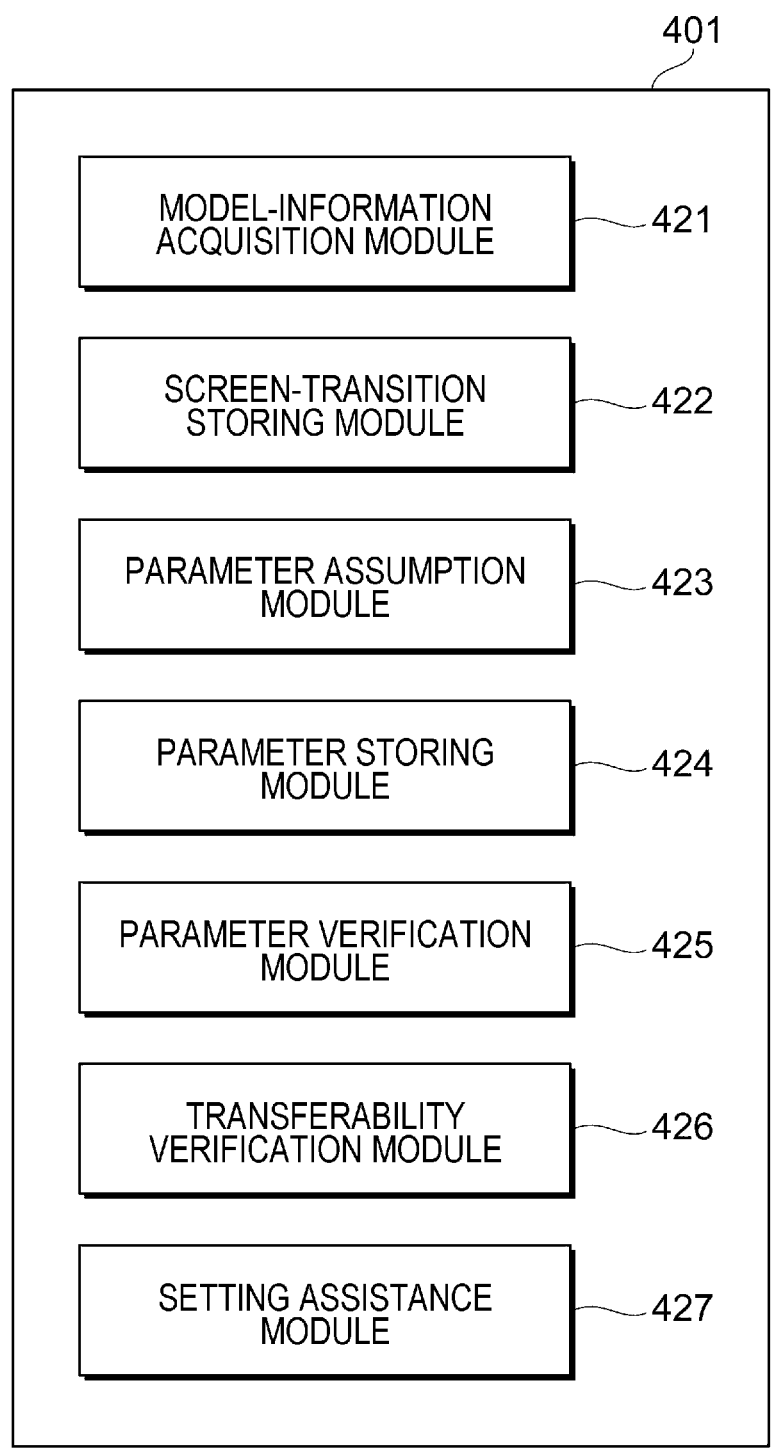
FIG. 5 is a diagram for explaining a functional configuration implemented by the control unit of the parameter-setting assistance server.

FIG. 5 is a diagram for explaining a functional configuration implemented by the control unit of the parameter-setting assistance server 40. The functional modules illustrated in FIG. 5 are implemented in such a manner that the CPU 411 (see FIG. 4) runs a program. Note that the functional modules illustrated in FIG. 5 are examples of functional modules provided by the control unit 401.

The control unit 401 in the exemplary embodiment functions as a model-information acquisition module 421 that acquires information regarding the model of the apparatus operated by the user, a screen-transition storing module 422 that stores operation screen transition accompanying a user operation, a parameter assumption module 423 that analyzes the operation screen transition and makes an assumption of a parameter having undergone the user operation, a parameter storing module 424 that stores the assumed parameter in association with the operation, a parameter verification module 425 that prompts the user to verify the parameter, a transferability verification module 426 that verifies whether the setting of the registered parameter or the like is transferable to an apparatus designated by the user, and a setting assistance module 427 that assists the user in performing an operation implementing the same setting as a parameter or the like in a registered setting operation.

The model-information acquisition module 421 in this exemplary embodiment acquires, from the terminal apparatus 30, information regarding the model of the apparatus to be operated by the user. The information regarding the model acquired at the time of operation registration is associated with a record of a parameter or the like for which a user operation is analyzed. The model-information acquisition module 421 acquires, from the terminal apparatus 30, the image of a string of characters or numerical values on the label on the housing of the image forming apparatus 20A or the like, the image of the appearance of the image forming apparatus 20A or the like, or the like and thereby designates the model.

The screen-transition storing module 422 in this exemplary embodiment makes an assumption of the operation screen being operated by the user from among operation screens that are highly likely to have transitioned and that are received from the terminal apparatus 30 and stores the assumed operation screen. The screen-transition storing module 422 in this exemplary embodiment performs matching between the operation screens highly likely to have transitioned and a list of operation screens of the operation target model and thereby makes an assumption of the operation screen operated by the user. The assumed operation screen is stored for each operation in the order of operations. In other words, the assumed operation screens are stored in a time series. The history of the operation screens stored in the order of operations represents the operation screen transition accompanying the user operation.

The parameter assumption module 423 analyzes the operation screen transition and makes an assumption of the content of the user operation causing the transition. In other words, the parameter assumption module 423 makes an assumption of the content of the parameter set by the user. Examples of the parameter setting by the user include selecting a parameter itself and selecting or inputting an attribute related to a specific parameter. The parameter assumption module 423 herein is an example of an assumption unit.

The parameter storing module 424 stores an assumed parameter in association with one operation. Note that the operation herein is also associated with an operation target apparatus (for example, the image forming apparatus 20A). The parameter storing module 424 herein is an example of a storing unit.

The parameter verification module 425 prompts the user who is an operator to verify the content of the assumed parameter. Specifically, the parameter verification module 425 receives acceptance or correction of the content of the assumed parameter from the terminal apparatus 30 (see FIG. 1). After the end of the verification by the user, the assumed parameter is stored as the content of an operation registered by the user. A difference from the job memory lies in that even the content of the parameter is stored.

The transferability verification module 426 is started when verification of transferability of the registered operation is requested from the terminal apparatus 30. The transferability verification module 426 receives the destination of the transfer-target registered operation and the destination of the transfer destination model.

A registered operation list is stored in the parameter-setting assistance server 40 for each model. The registered operation management information may include information identifying the user who registers an operation. Note that an operation registered by a different user is also displayed as the list.

A method for designating a transfer destination model includes a method by which a transfer destination model is selected from a model list, a method by which a transfer destination model is designated by reading a label or the like on an apparatus to be actually operated (hereinafter, also referred to as an actual apparatus), a method by which a transfer destination model is designated from the image of the appearance of the actual apparatus, a method by which information designating the model is acquired through connection with the actual apparatus, and other methods.

After the registered operation as a transferability verification target and the transfer destination model are designated, the transferability verification module 426 verifies, for each parameter, whether the same setting as that in the registered operation is implementable in the transfer destination model.

Incidentally, the model used for the operation registration and the transfer destination model do not necessarily have the same parameter name, expression, or the like displayed on the operation screen. However, the parameter-setting assistance server 40 in this exemplary embodiment has a list in which parameter relationships between models are recorded. The list herein also has recorded attribute relationships between models. Note that one parameter in a model may be associated with a group of parameters in a different model. The same also holds true for attributes.

The transferability verification module 426 verifies whether the parameter is transferable for each set parameter and notifies the terminal apparatus 30 of the verification result. The transferability verification module 426 herein is an example of the presentation unit.

The setting assistance module 427 is started in a case where assistance in an operation for setting the same parameter as the parameter in the registered operation is requested from the terminal apparatus 30. The setting assistance module 427 receives the designation of the registered operation for which assistance is to be performed and the designation of the actual apparatus as an assistance target.

The registered operation list is the same as that in the description of the transferability verification module 426.

A method for designating an assistance target model includes a method by which an assistance target model is selected from the model list, a method by which an assistance target model is designated by reading a label or the like on the actual apparatus, a method by which an assistance target model is designated from the image of the appearance of the actual apparatus, a method by which information designating the model is acquired through connection with the actual apparatus, and other methods.

After the registered operation and the actual apparatus to be operated are designated, the setting assistance module 427 generates a screen for specifically giving an instruction for operating the part of the operation screen to set the same parameter as the parameter in the registered operation and notifies the terminal apparatus 30 of the screen. In this exemplary embodiment, the setting assistance module 427 also has a function of performing image recognition of an operation screen displayed on the actual apparatus and specifically gives the instruction for operating the part of the recognized operation screen. To give the instruction, for example, highlighting, a virtual frame, and voice guidance are used.

In this exemplary embodiment, the assistance by the setting assistance module 427 is terminated at a time point when the user designates assistance termination, a time point when sound such as mechanical sound indicating the termination of a setting operation is detected, a time point when a predetermined period of time elapses with no change detected on the operation screen, or other time points. The setting assistance module 427 herein is an example of the presentation unit.

Specific Operation Examples

Hereinafter, examples of specific operations performed by using the terminal apparatus 30 (see FIG. 1) having the above-described functions and the parameter-setting assistance server 40 (see FIG. 1) will be described.

Actions Performed when Operation Registration is Selected

Figure 6:
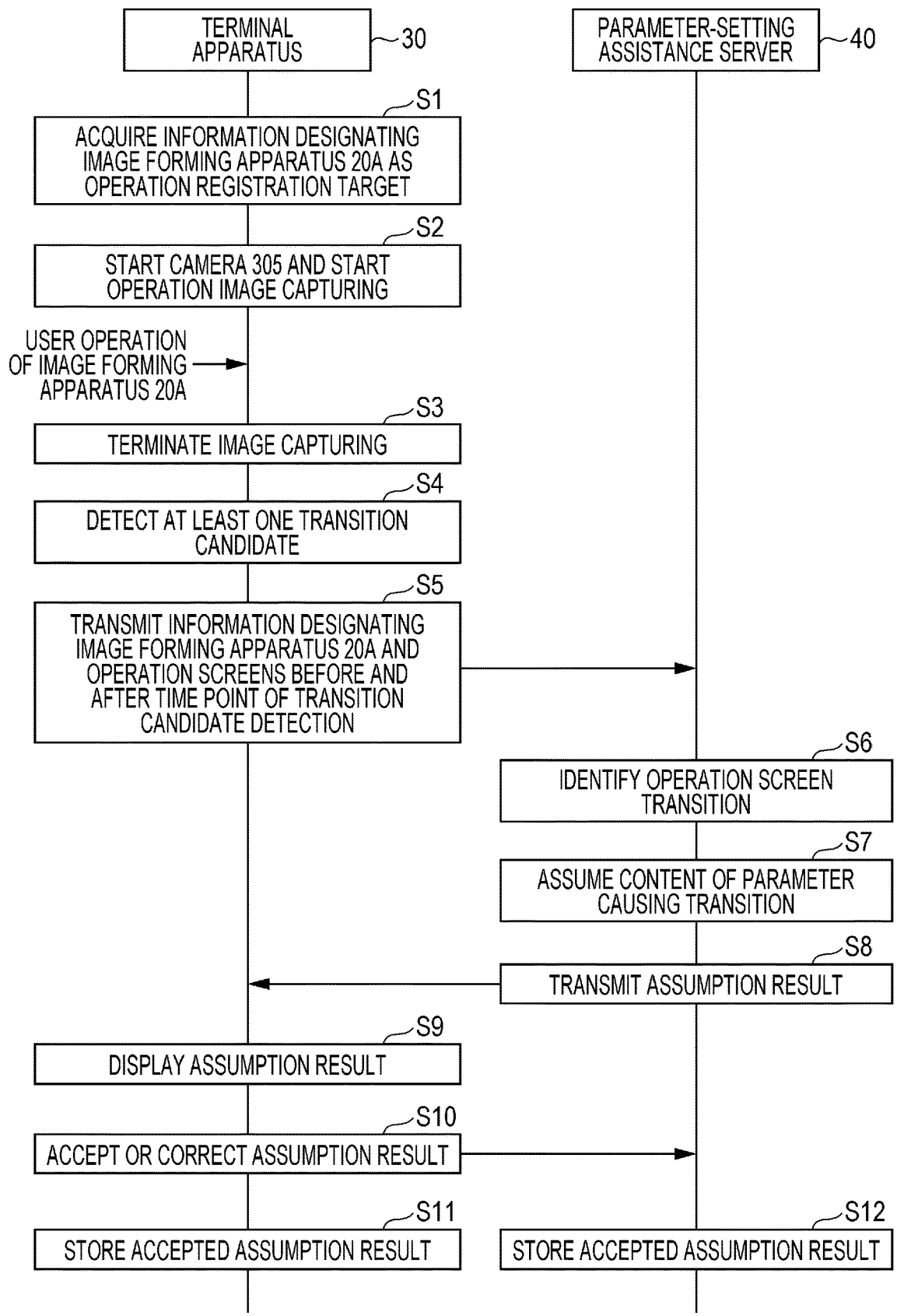
FIG. 6 is a sequence diagram for explaining actions of registering an operation.

FIG. 6 is a sequence diagram for explaining actions of registering an operation. In FIG. 6, the alphabetical letter S denotes a step.

First, the user who intends to register an operation operates the terminal apparatus 30 and thereby acquires information designating the image forming apparatus 20A that is an operation registration target (step 1). The information designating the model is acquired, for example, by reading characters or the like printed on the surface of the housing.

The user starts the camera 305 (see FIG. 2) and starts operation image capturing (step 2). Note that the camera 305 may be started under the control of the terminal apparatus 30. The user thereafter starts operating the image forming apparatus 20A. The image capturing is continued until the end of the operation (step 3).

Figure 7:
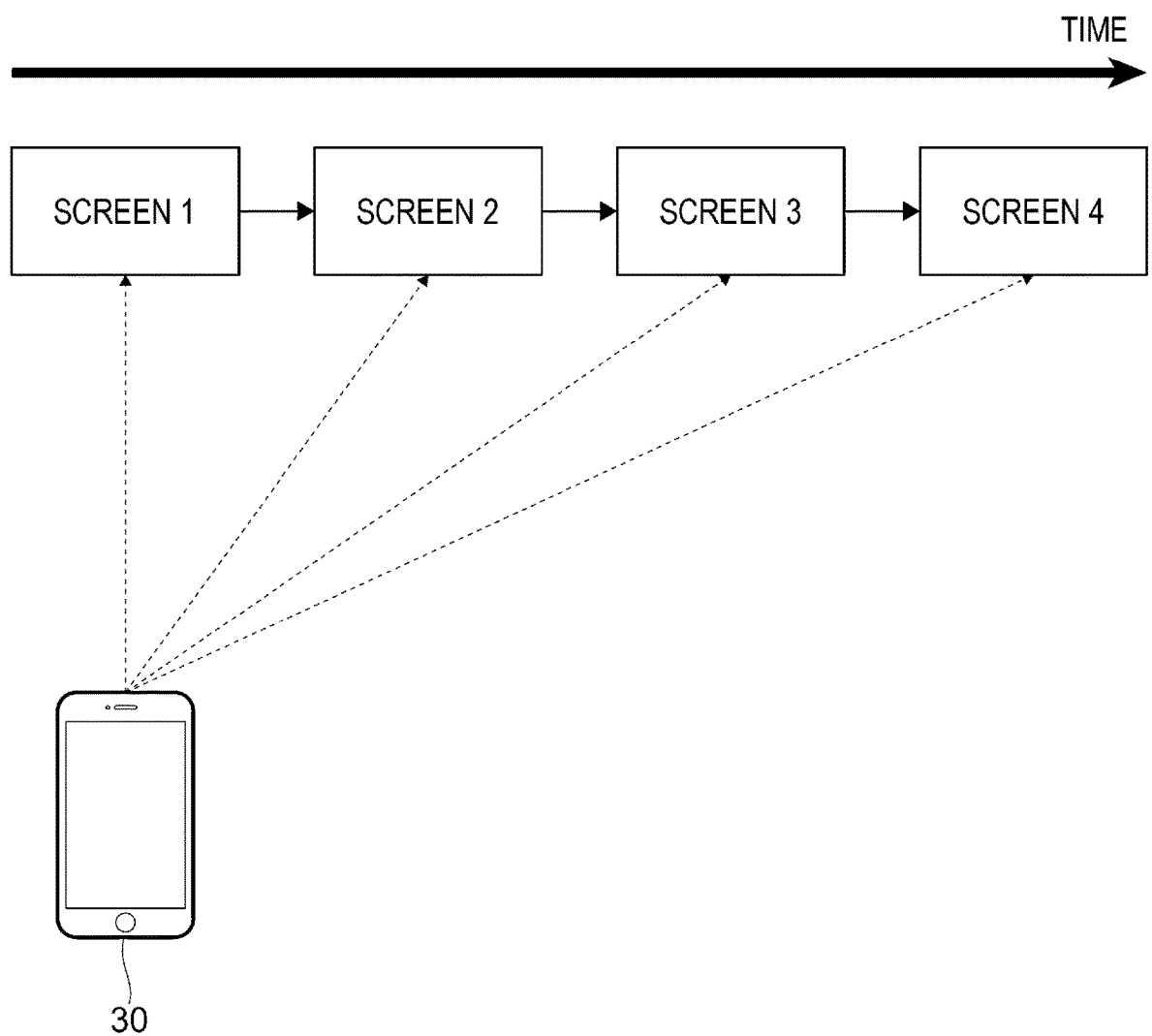
FIG. 7 is a diagram for explaining how the terminal apparatus captures images of operation screens.

FIG. 7 is a diagram for explaining how the terminal apparatus 30 captures images of operation screens. In this exemplary embodiment, the operation target is the image forming apparatus 20A installed in the place A (see FIG. 1).

Screen 1, Screen 2, Screen 3, and Screen 4 in FIG. 7 correspond to respective operation screens appearing in a time series in accompany with operations by the user. If still images are captured with the camera 305, the user captures the images of Screen 1, Screen 2, Screen 3, and Screen 4 in order. If a moving image is captured with the camera 305, the user captures the image continuously from the start to the end of an operation to be registered.

FIG. 6 is explained again.

In FIG. 6, the terminal apparatus 30 processes data regarding the captured images and detects at least one transition candidate (step 4). The terminal apparatus 30 then transmits the information designating the image forming apparatus 20A and operation screens before and after the time point of the transition candidate detection (step 5) to the parameter-setting assistance server 40.

The parameter-setting assistance server 40 performs matching with the operation screen list held for the target apparatus and thereby identifies operation screen transition accompanying the user operation (step 6).

Figure 8:
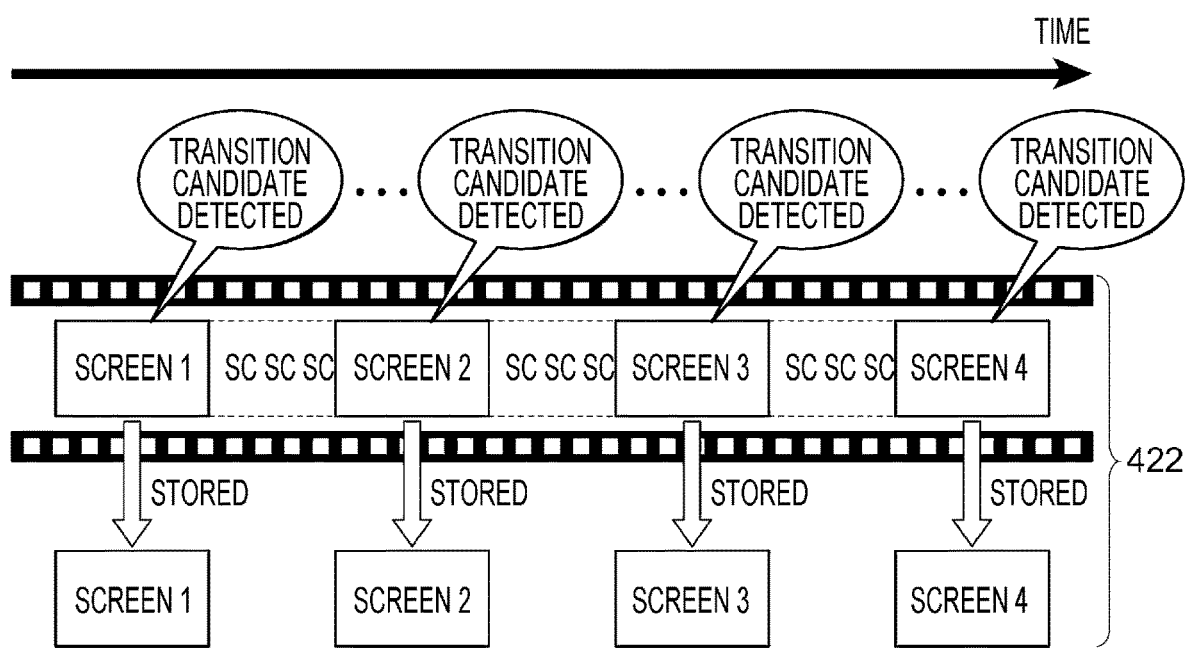
FIG. 8 is a diagram for explaining how the parameter-setting assistance server identifies an operation screen.

FIG. 8 is a diagram for explaining how the parameter-setting assistance server 40 (see FIG. 1) identifies an operation screen. The operation screen is identified by the screen-transition storing module 422 (see FIG. 5).

In the middle part of in FIG. 8 in the up-down directions, operation screens detected by the terminal apparatus 30 (see FIG. 1) as transition candidates are arranged in a time series. Although FIG. 8 illustrates balloons only at time points involved with a change of the operation screens, transition candidates are also detected between these time points. For example, a changed screen corresponding to Pattern 2 (see FIG. 9) described later is also detected as a transition candidate.

The screen-transition storing module 422 performs matching between each operation screen received from the terminal apparatus 30 and the operation screen list prepared as operation target apparatuses and makes an assumption of the operation screen transition. Specifically, four screens matching the list, that is, Screen 1, Screen 2, Screen 3, and Screen 4 are extracted.

FIG. 6 is explained again.

In FIG. 6, the parameter-setting assistance server 40 makes an assumption of the content of a parameter causing the transition (step 7). The content of the set parameter may be assumed from a relationship between operation screens adjacent to each other.

Figure 9A:
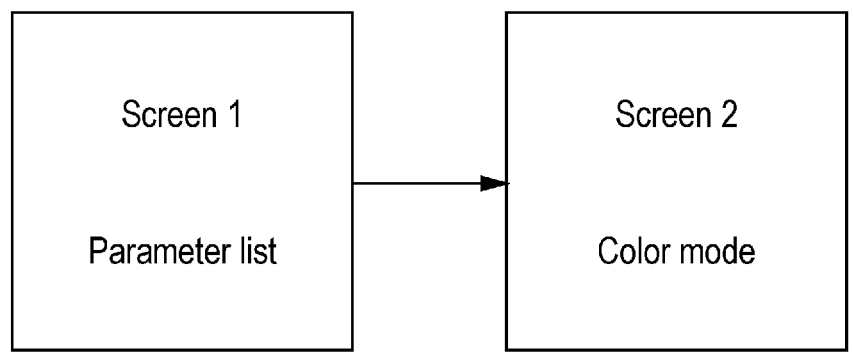
FIGS. 9A and 9B are views for explaining how a parameter assumption module makes an assumption of a parameter and respectively illustrate Pattern 1 and Pattern 2 as transition patterns.
Figure 9B:
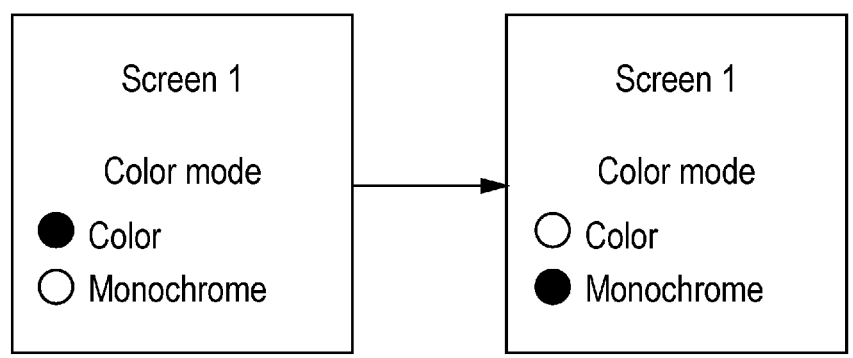

FIGS. 9A and 9B are views for explaining how the parameter assumption module 423 (see FIG. 5) makes an assumption of a parameter and respectively illustrate Pattern 1 and Pattern 2 as transition patterns.

Pattern 1 is an example where an operation screen is changed from Screen 1 to Screen 2. In FIG. 9A, Screen 1 is a parameter list screen, while Screen 2 is a setting screen changed to indicate an attribute related to color mode. This change is accompanied by a change of the layout itself of the operation screen. In Pattern 1, the operation screen transition is assumed to be attributable to the selection of Color mode in the parameter list displayed on Screen 1.

Pattern 2 corresponds to a change of the attribute with the operation screen still being Screen 1. In the examples in FIGS. 9A and 9B, attributes settable for Color mode are two attributes that are Color and Monochrome. Color is set on Screen 1, while Monochrome is set on Screen 2. Note that even if the user changes the attribute between Color and Monochrome multiple times, the attribute finally selected by the user is registered. In the case of Pattern 2, the parameter assumption module 423 thus registers the content of the final setting in the operation record.

FIG. 6 is explained again.

Upon completion of the assumption of the parameter for the registration target operation, the parameter verification module 425 (see FIG. 5) transmits the assumption result to the terminal apparatus 30 (step 8).

The terminal apparatus 30 displays the received assumption result (step 9).

The terminal apparatus 30 thereafter receives user's acceptance or correction to the assumption result (step 10).

In this exemplary embodiment, the acceptance of the assumption result is notified also to the parameter-setting assistance server 40. The accepted assumption result is thus stored in both of the terminal apparatus 30 and the parameter-setting assistance server 40 (steps 11 and 12).

Example Screens Displayed on Terminal Apparatus

Example screens displayed on the terminal apparatus 30 in accompany with the operation registration will be described.

Figure 10:
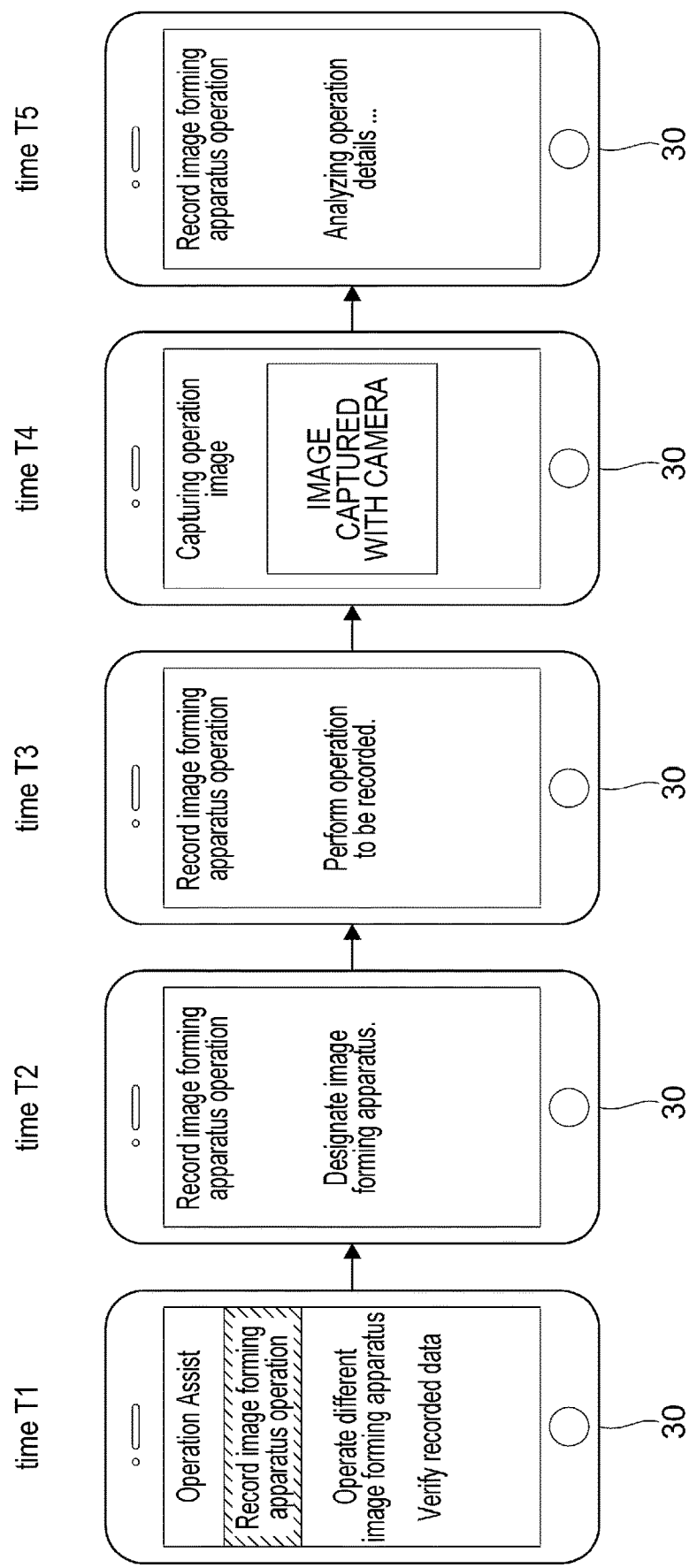
FIG. 10 is a view for explaining transitions from a screen for receiving an instruction to register an operation to a screen displayed at a time point when a parameter is assumed.

FIG. 10 is a view for explaining transitions from a screen for receiving an instruction to register an operation to a screen displayed at a time point when a parameter is assumed.

The screen corresponding to time T1 is an initial screen from which an instruction to record an operation may be provided. Three options that are Record image forming apparatus operation, Operate different image forming, and Verify recorded data are selectable on the initial screen illustrated in FIG. 10.

At time T1, the user selects Record image forming apparatus operation.

The screen corresponding to time T2 is displayed when Record image forming apparatus operation is selected at time T1. In the example in FIG. 10, designation of an image forming apparatus is requested.

The screen corresponding to time T3 is displayed after the designation of the image forming apparatus is complete. In the example in FIG. 10, the user is prompted to start an operation to be recorded. Image capturing with the camera 305 (see FIG. 2) is started before the screen corresponding to time T3 or in conjunction with the displaying.

The screen corresponding to time T4 is displayed to enable the user to verify whether images of the user operation are being captured.

The screen corresponding to time T5 is a screen indicating that the operation the image of which is captured is being analyzed by the parameter-setting assistance server 40 (see FIG. 1).

Figure 11:
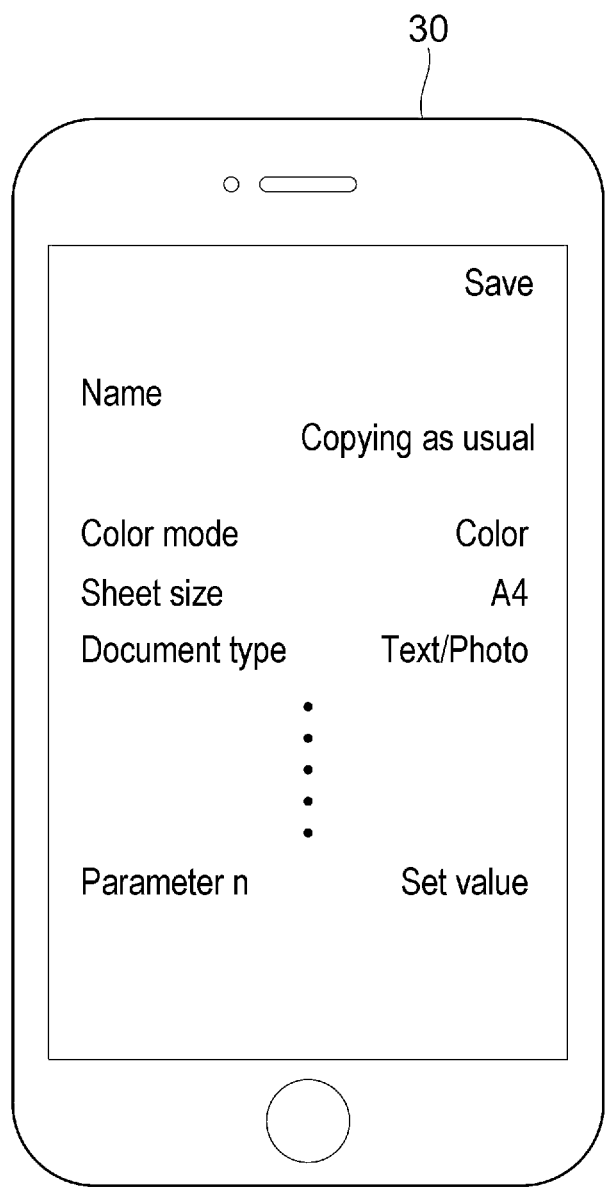
FIG. 11 is a view illustrating an example screen for requesting verification of an assumption result.

FIG. 11 is a view illustrating an example screen for requesting verification of an assumption result.

After the parameter-setting assistance server 40 completes the analysis, the screen illustrated in FIG. 11 is displayed on the terminal apparatus 30.

In FIG. 11, a registration target operation is named Copy as usual. The name may be input by the time an assumed parameter is stored. In FIG. 11, Color for Color mode, A4 for Sheet size, Text/Photo for Document type, . . . and Set value for Parameter n are described as assumed parameters. The symbol herein "/" denotes "or".

When the Save button in the upper right corner of FIG. 11 is operated, the content of the assumed parameter is entered. Note that if the assumption result is different from the actual operation, correction may be made on the screen illustrated in FIG. 11. The correction includes a partial modification, an addition, a deletion, and the like.

Figure 12:
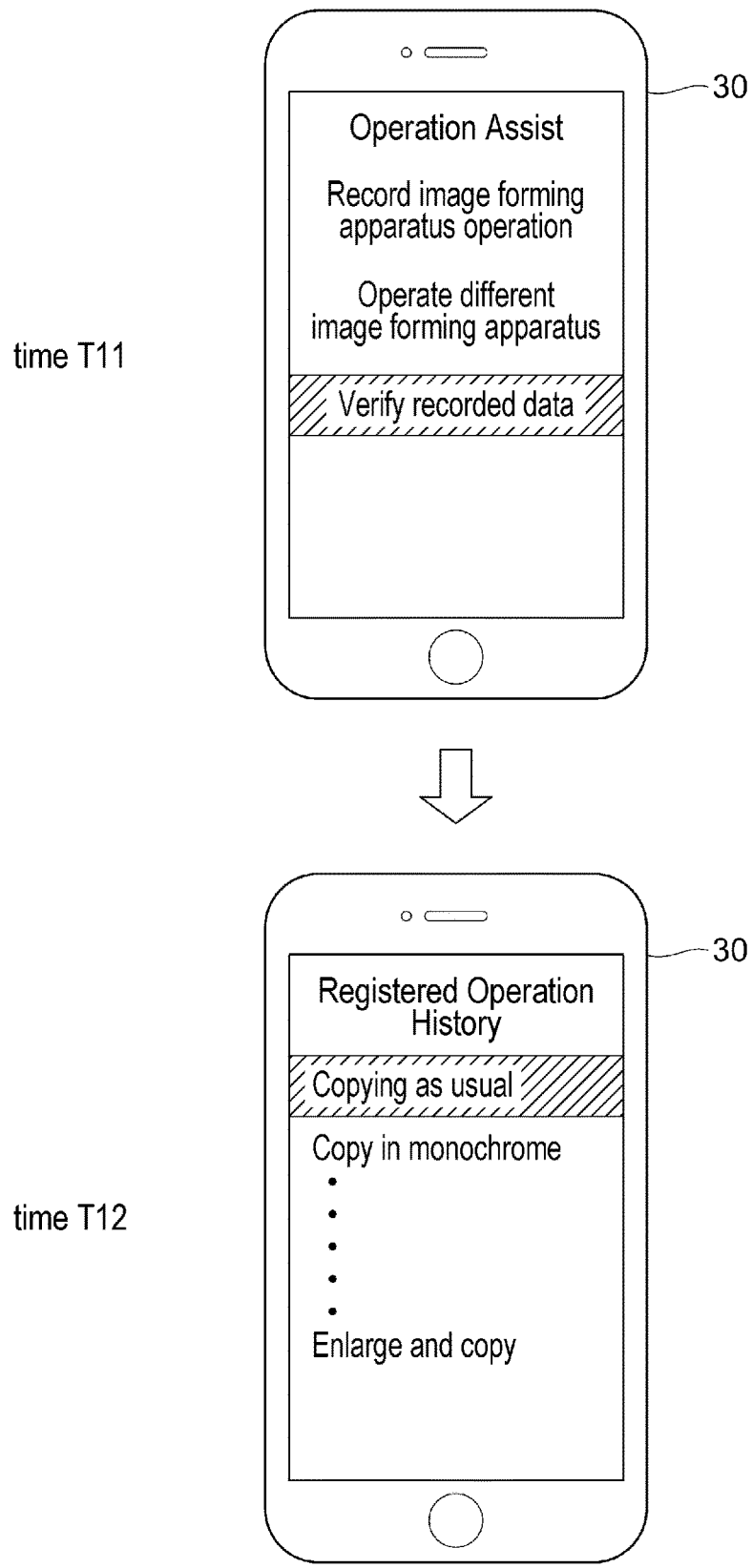
FIG. 12 is a view illustrating example screens used for verifying a recorded operation history.

FIG. 12 is a view illustrating example screens used for verifying a recorded operation history.

The screen corresponding to time T11 is the same as the initial screen in FIG. 10. At time T11, Verify recorded data is selected by the user.

The screen corresponding to time T12 is an example screen displaying a recorded operation history. In FIG. 12, the names of registered operations are displayed as a list.

The example in FIG. 12 illustrates Copy as usual, Copy in monochrome, . . . and Enlarge and copy. For example, when Copy as usual is selected, the screen illustrated in FIG. 11 is displayed. The Save button is not displayed on the verification screen.

Actions Performed When Transferability Verification Is Selected

Figure 13:
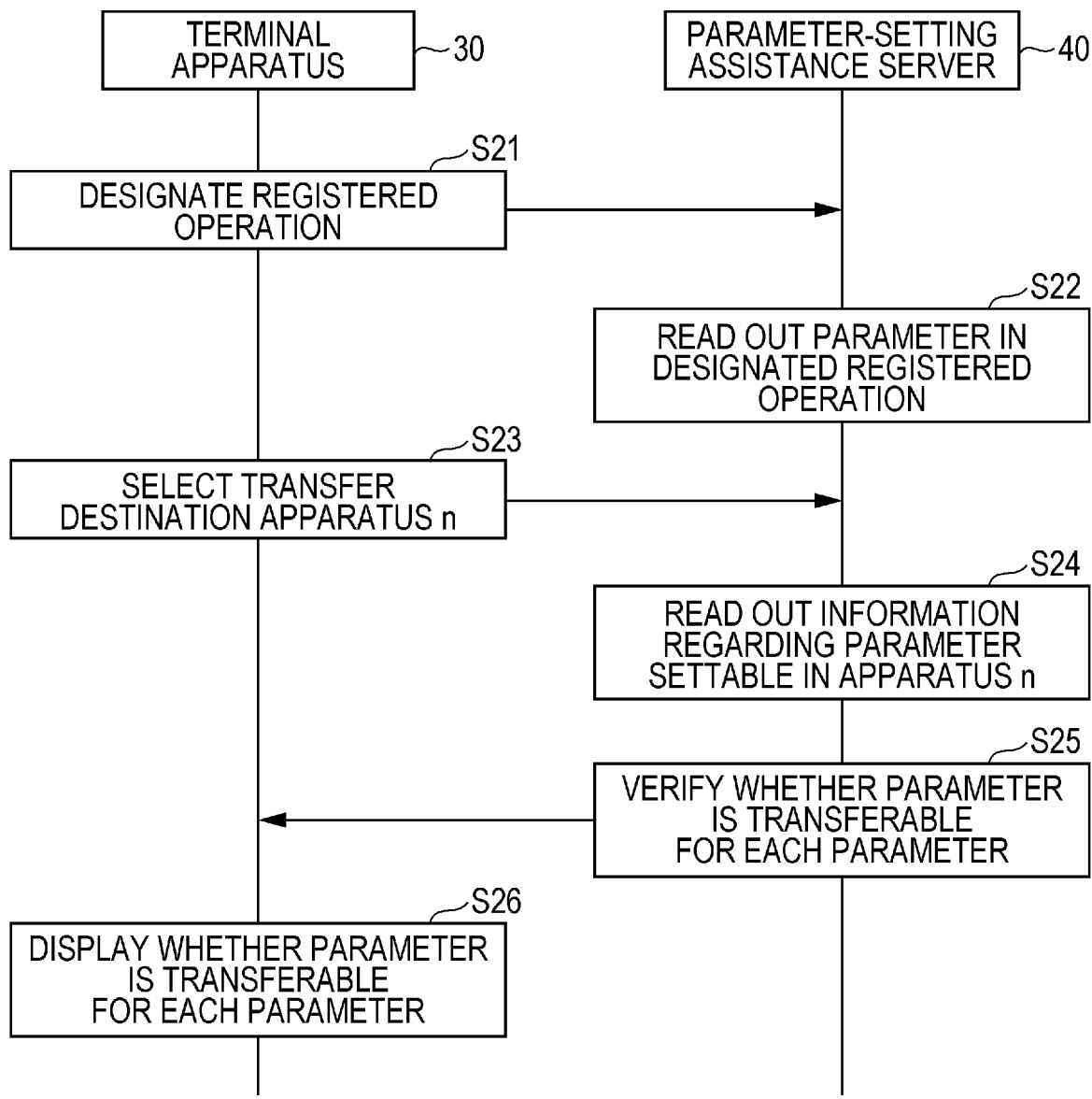
FIG. 13 is a sequence diagram for explaining actions of verifying transferability.

FIG. 13 is a sequence diagram for explaining actions related to the transferability verification. Also in FIG. 13, the alphabetical letter S denotes a step.

First, the user who intends to verify transferability operates the terminal apparatus 30 and thereby designates a registered operation (step 21). In FIG. 13, the information regarding the designated registered operation is notified from the terminal apparatus 30 to the parameter-setting assistance server 40. The parameter-setting assistance server 40 reads out the parameter in the designated registered operation (step 22).

The user who intends to verify the transferability operates the terminal apparatus 30 and selects an apparatus n as a transfer destination (step 23). The selection is performed from a model list or by designating an actual apparatus. If the actual apparatus is designated, the apparatus configuration of the actual apparatus is read out to the terminal apparatus 30 through communications with the actual apparatus. However, if the parameter-setting assistance server 40 is capable of reading out the apparatus configuration of the actual apparatus, the terminal apparatus 30 does not have to read out the apparatus configuration.

After being notified of the information regarding the apparatus n that is the registered operation transfer destination, the parameter-setting assistance server 40 reads out information regarding a parameter settable in the apparatus n (step 24). If the apparatus n is selected from the model list, the parameter-setting assistance server 40 reads out information in the maximum settable range for the apparatus n. In contrast, if the actual apparatus is designated as the apparatus n, the parameter-setting assistance server 40 reads out information regarding a parameter actually settable in the designated actual apparatus. For example, if a finisher may be attached to the designated model, the parameter-setting assistance server 40 reads out information regarding a parameter that is settable on the assumption that the finisher is attached. In contrast, if the finisher is not attached to the actual apparatus, the parameter-setting assistance server 40 reads out information regarding a parameter settable excluding functions for the finisher. The finisher is a device that performs, for example, stapling, punching, or other finishing processes.

The parameter-setting assistance server 40 verifies whether the parameter is transferable for each parameter in the registered operation (step 25). The name of a parameter is likely to vary depending on the model, and a name correspondence list or the like stored in advance is thus used. Whether the parameter is transferable is notified from the parameter-setting assistance server 40 to the terminal apparatus 30.

The terminal apparatus 30 receiving the notification displays whether the parameter is transferable for each parameter in the registered operation (step 26).

Figure 14:
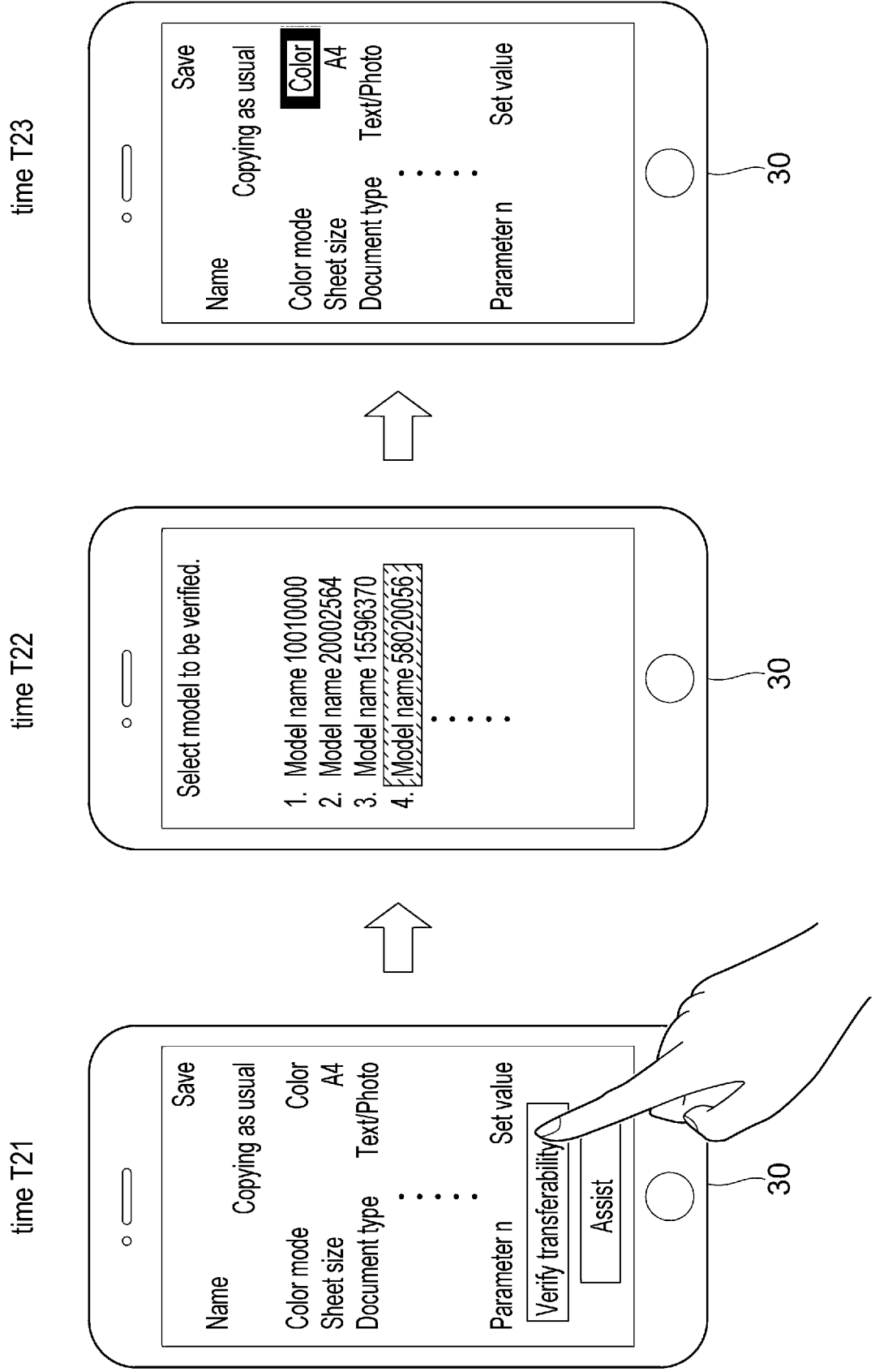
FIG. 14 is a view illustrating example screen transitions performed when a button for requesting transferability verification is operated.

FIG. 14 is a view illustrating example screen transitions performed when a button for requesting transferability verification is operated.

After the parameter-setting assistance server 40 completes the analysis, the screen illustrated in FIG. 11 is displayed on the terminal apparatus 30.

The screen displayed at time T21 represents operation of the Verify transferability button on the screen for verifying registered operation transferability.

The screen displayed at time T22 represents the list used for selecting a model name. At time T22, the model name "58020056" is selected.

The screen displayed at time T23 represents whether parameters for the registered operation are respectively settable. At time T23, the attribute of Color mode is highlighted. The highlighting indicates that the parameter is not settable. For example, if the designated model is a monochrome printer, it is not possible to set color printing.

In addition to the highlighting, a parameter not settable may be displayed with a caption, in a changed font, or in a changed color for the font.

Actions Performed when Setting Operation Assistance (Assist) is Selected

Figure 15:
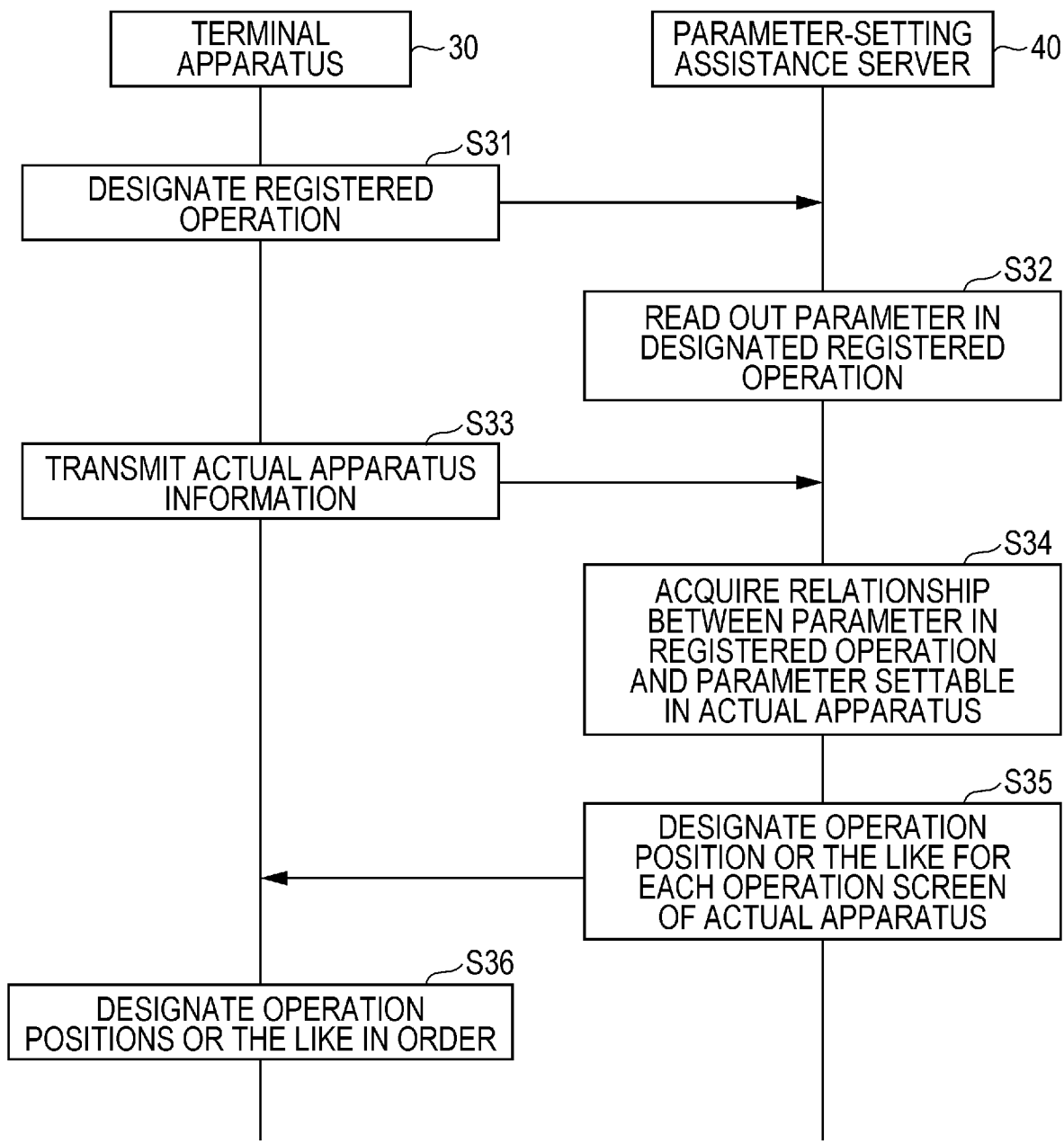
FIG. 15 is a sequence diagram for explaining actions of assisting in a setting operation (assist)

FIG. 15 is a sequence diagram for explaining actions of assisting in a setting operation (Assist). Also in FIG. 15, the alphabetical letter S denotes a step.

First, the user who intends to be assisted in a setting operation operates the terminal apparatus 30 and designates a registered operation (step 31). In FIG. 15, information regarding the designated registered operation is notified from the terminal apparatus 30 to the parameter-setting assistance server 40. The parameter-setting assistance server 40 reads out parameter in the designated registered operation (step 32).

The terminal apparatus 30 transmits information regarding the actual apparatus to the parameter-setting assistance server 40 (step 33). Various methods are prepared to input the information designating the actual apparatus. For example, a designation method based on barcode, quick response (QR) code (registered trademark), and other code reading, based on image capturing and designation of the image forming apparatus, or based on a touch of the image forming apparatus.

After the information regarding the actual apparatus for the setting is notified, the parameter-setting assistance server 40 acquires a relationship between the parameter in the registered operation and a parameter settable for the actual apparatus (step 34).

The parameter-setting assistance server 40 thereafter designates an operation position or the like for each operation screen of the actual apparatus (step 35). The designated operation positions or the like are transmitted from the parameter-setting assistance server 40 to the terminal apparatus 30.

The terminal apparatus 30 designates the received operation positions or the like in order (step 36).

Figure 16:
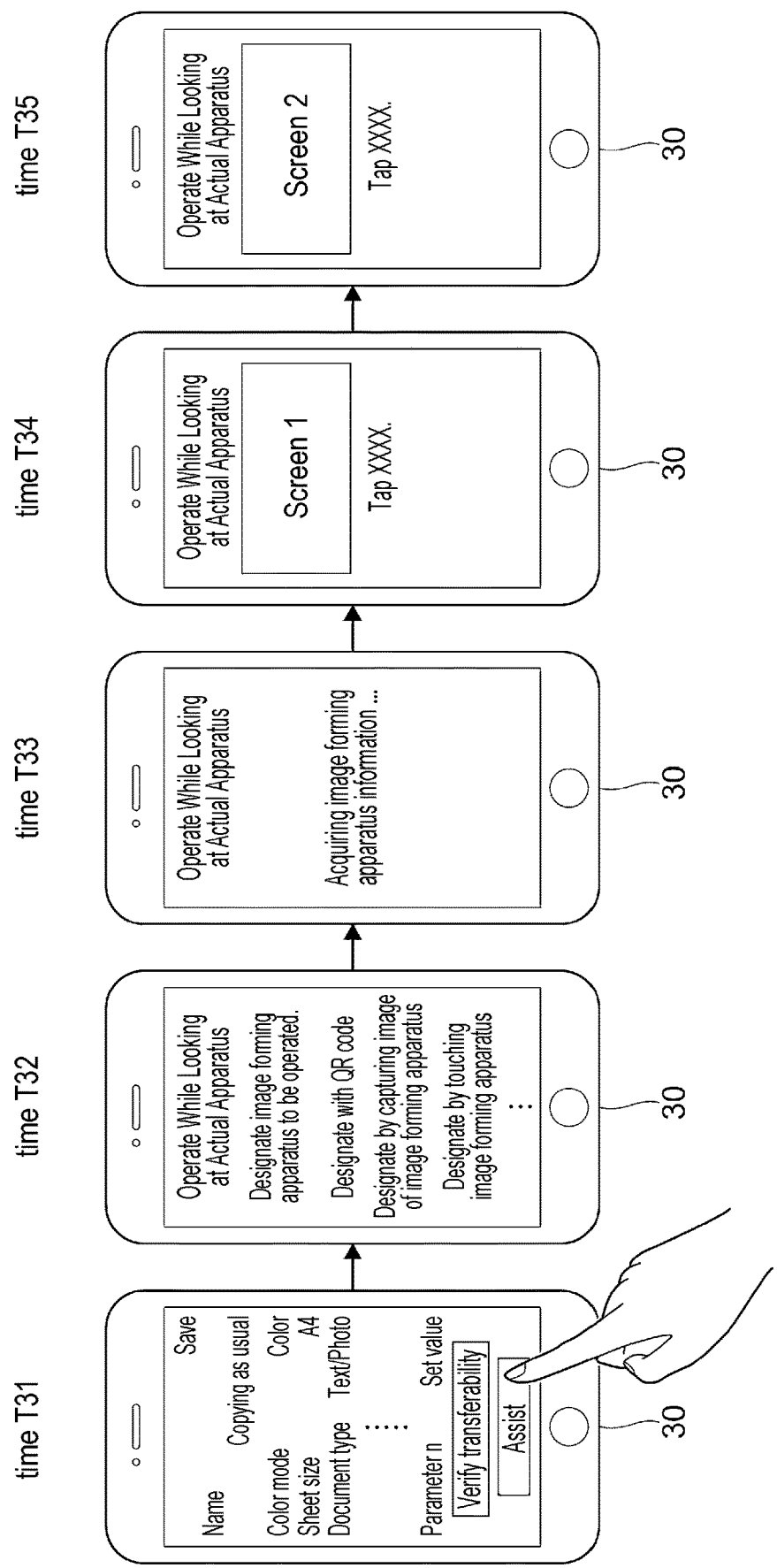
FIG. 16 is a view illustrating example transition of setting assistance screens.

FIG. 16 is a view illustrating example transition of setting assistance screens. FIG. 16 assumes that the terminal apparatus 30 is a portable terminal such as a smartphone. Specifically, a case where the user operates the operation screen of the image forming apparatus 20B (see FIG. 1) with the terminal apparatus 30 carried in one hand is assumed.

The screen corresponding to time T31 represents the operation of the Assist button on the screen for verifying registered operation transferability.

The screen corresponding to time T32 represents a screen for receiving the designation of the operation target image forming apparatus 20B. The example in FIG. 16 illustrates three types of designation that are Designate with QR code, Designate by capturing an image of image forming apparatus, and Designate by touching image forming apparatus. The user selects one of the methods and acquires information regarding the image forming apparatus 20B to be operated.

The screen corresponding to time T33 is a screen indicating to the user that the information regarding the image forming apparatus 20B is being acquired.

The screens corresponding to time T34 and time T35 represent example screens for assistance in operation position or the like.

The screen corresponding to time T34 illustrates a case where the operation screen is Screen 1. In the example in FIG. 16, the message "Tap XXXX." indicates an item to be set by the user. Note that a screen explicitly indicating the operation position on the screen 1 to the user may be provided.

The screen corresponding to time T35 displays the operation screen changed to Screen 2. The method for notifying the user of the operation position is the same as that for Screen 1.

Even when the user operates the unfamiliar image forming apparatus 20B, the displaying of the assistance screen enables the user to perform the same setting operation as that on the familiar image forming apparatus 20A.

Figure 17:
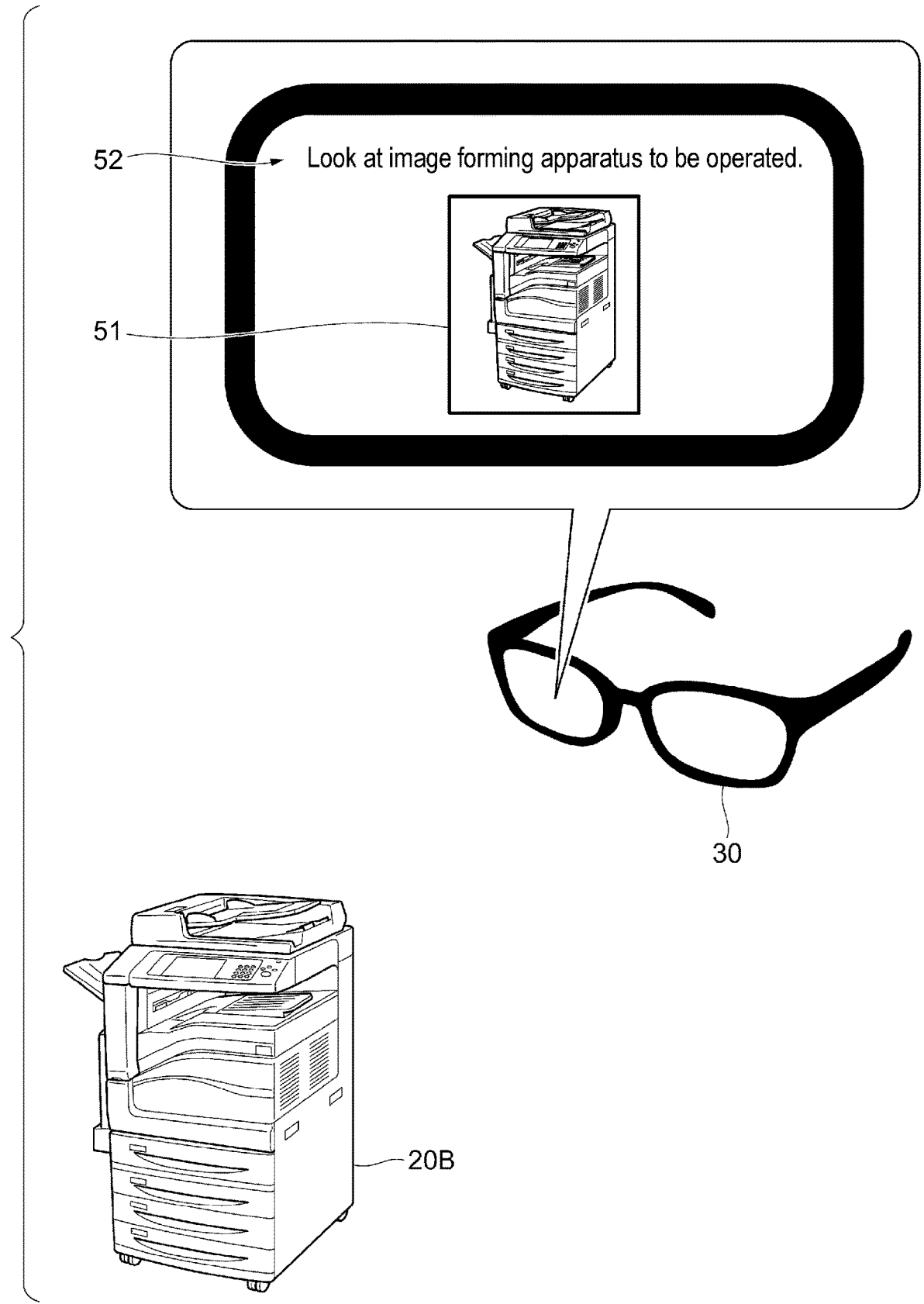
FIG. 17 is a view for explaining how an operation is to be performed when the terminal apparatus is an eye-glass wearable terminal.

FIG. 17 is a view for explaining how an operation is to be performed when the terminal apparatus 30 is an eye-glass wearable terminal. In FIG. 17, the user wearing the terminal apparatus 30 on the head sees not only the image forming apparatus 20B that exists in front of the user but also a virtual frame 51 that does not exist in the real space and a character string 52. The balloon represents a virtual space seen by the user.

The frame 51 herein is used to notify the user of the operation target apparatus recognized by the terminal apparatus 30. The character string 52 describes an action requested to the user. In FIG. 17, the message "Look at image forming apparatus to be operated" is displayed in such a manner as to float in the space.

Technology for superimposing virtual visual information generated by a computer on an existing object is called augmented reality (AR) or mixed reality (MR).

Figure 18:
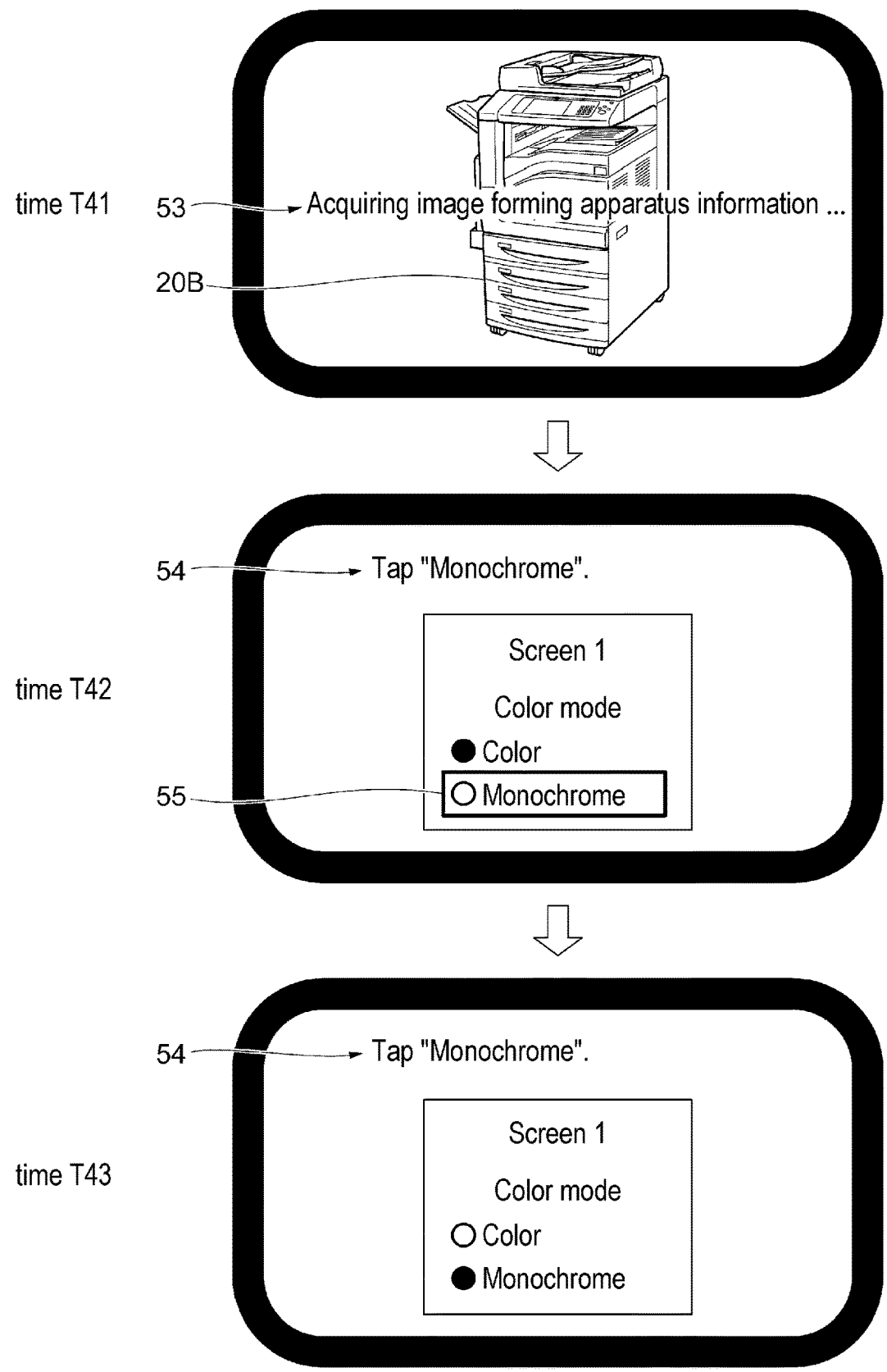
FIG. 18 is a view for explaining how an operation is to be performed when the terminal apparatus is the eye-glass wearable terminal.

FIG. 18 is a view for explaining how an operation is to be performed when the terminal apparatus 30 is the eye-glass wearable terminal.

The screen corresponding to time T41 indicates that the information regarding the image forming apparatus 20B that exists in a range corresponding to the frame 51 (see FIG. 17) is being acquired. In the example of time T41, a caption 53 is displayed in such a manner as to be superimposed on the existing image forming apparatus 20B.

The screen corresponding to time T42 illustrates example assistance information presented while the user is looking at the operation screen of the image forming apparatus 20B. In this example, a caption 54 indicating Tap "Monochrome" is displayed in addition to Screen 1, and a frame 55 is displayed at the tapping position on Screen 1 in such a manner as to be superimposed on Screen 1. The frame 55 is also a virtual image. Displaying the frame 55 enables the user to find the operation position even on Screen 1 that is unfamiliar.

The screen corresponding to time T43 indicates a screen having undergone the user operation. The caption 54 remains at time T43, but the frame 55 is not displayed because the operation of the Monochrome button is verified.

Other Exemplary Embodiments

The exemplary embodiment of the present disclosure has heretofore been described; however, the technical scope of the present disclosure is not limited to the scope of the description of the exemplary embodiment above. From the description of the scope of claims, it is apparent that the technical scope of the disclosure includes various modifications and improvements made to the exemplary embodiment described above.

Whether the user who registers an operation for the image forming apparatus 20A (see FIG. 1) and the user who intends to apply the registered operation to the image forming apparatus 20B (see FIG. 1) are identical is not described in the exemplary embodiment. The user operating the image forming apparatus 20A (see FIG. 1) and the user operating the image forming apparatus 20B (see FIG. 1) are not necessarily identical.

In the exemplary embodiment described above, the assistance service is provided in cooperation between the terminal apparatus 30 (see FIG. 1) and the parameter-setting assistance server 40 (see FIG. 1); however, all of the processing steps may be performed only by the terminal apparatus 30 or only by the parameter-setting assistance server 40. However, note that even if the parameter-setting assistance server 40 performs all of the processing steps, the terminal apparatus 30 needs to be used to capture an image of an actual apparatus and input information. The terminal apparatus 30 and the parameter-setting assistance server 40 herein are each an example of an information processing apparatus.

In addition, in the exemplary embodiment described above, FIGS. 6, 13, 15 are described as examples of cooperation between the terminal apparatus 30 and the parameter-setting assistance server 40. However, how the terminal apparatus 30 and the parameter-setting assistance server 40 take charge of the processing steps is not limited to the description.

In the exemplary embodiment described above, each of the first apparatus and the second apparatus is an image forming apparatus. However, each of the first apparatus and the second apparatus is not necessarily an image forming apparatus and may be a computer such as an information processing apparatus or a large household appliance such as a washing machine or an electric cooker.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
  a processor configured to
    determine content of a parameter that was set on a first apparatus by analyzing an image captured in a time series, wherein the image depicts an operation on the first apparatus;
    cause the content of the parameter to be stored as an operation record; and
    extract a difference between an image of a user-operation receiving screen that is changed and an image of the user-operation receiving screen that is yet to be changed and make a determination of the operation performed by the user on a basis of a parameter relevant to the difference.

2. The information processing apparatus according to claim 1,
  wherein a screen for verifying the content of the parameter that is determined is presented to a user.

3. The information processing apparatus according to claim 2,
  wherein a change of the content of the parameter that is determined is received on the screen.

4. The information processing apparatus according to claim 1,
wherein if the difference corresponds to a change in a mode of displaying an option or a change in an indicator for a selection state of the option, the processor is configured to make a determination that a character string in the option, a state of which is changed to a selected state, is the content of the parameter set by the user.

5. The information processing apparatus according to claim 1, wherein
processor is configured to present a result of verification to a user in response to execution of a function of verifying whether the stored content of the parameter is settable in a second apparatus different from the first apparatus.

6. The information processing apparatus according to claim 5,
wherein whether the stored content is settable is presented on a per parameter-content basis.

7. A non-transitory computer readable medium storing a program causing a computer to execute a process comprising:
determining content of a parameter that was set on a first apparatus by analyzing an image captured in a time series, wherein the image depicts an operation on the first apparatus; and
storing the content of the parameter as an operation record; and
presenting an operation for implementing a setting having the content of the parameter on an operation screen of a second apparatus different from the first apparatus, the operation being presented upon receiving an instruction to execute a function of assisting in the operation for implementing the setting having the content of the parameter.

8. The non-transitory computer readable medium according to claim 7, further comprising
presenting an instruction for performing the operation for implementing the setting having the content of the parameter in augmented reality or mixed reality by using a terminal worn by a user.

9. A non-transitory computer readable medium storing a program causing a computer to execute a process comprising:
determining content of a parameter that was set on a first apparatus by analyzing an image captured in a time series, wherein the image depicts an operation on the first apparatus;
storing the content of the parameter as an operation record; and
extracting a difference between an image of a user-operation receiving screen that is changed and an image of the user-operation receiving screen that is yet to be changed and making a determination of the operation performed by the user on a basis of a parameter relevant to the difference.

\* \* \* \* \*